United States Patent
Taherzadeh Boroujeni et al.

(10) Patent No.: US 11,438,116 B2
(45) Date of Patent: Sep. 6, 2022

(54) FLOATING-BAND CSI-RS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Kapil Gulati, Montgomery, NJ (US); Sony Akkarakaran, Poway, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/031,555

(22) Filed: Sep. 24, 2020

(65) Prior Publication Data

US 2021/0091903 A1 Mar. 25, 2021

Related U.S. Application Data

(60) Provisional application No. 62/905,944, filed on Sep. 25, 2019.

(51) Int. Cl.
*H04L 5/00* (2006.01)
*H04W 72/12* (2009.01)
*H04W 72/04* (2009.01)

(52) U.S. Cl.
CPC ......... *H04L 5/0048* (2013.01); *H04W 72/042* (2013.01); *H04W 72/1289* (2013.01)

(58) Field of Classification Search
CPC .............. H04L 5/0048; H04W 72/042; H04W 72/1289
See application file for complete search history.

(56) References Cited

U.S. PATENT DOCUMENTS

| | | | |
|---|---|---|---|
| 2019/0053235 A1* | 2/2019 | Novlan | H04L 43/087 |
| 2019/0191411 A1* | 6/2019 | Petersson | H04W 72/082 |
| 2019/0260447 A1 | 8/2019 | Nam et al. | |
| 2021/0400632 A1* | 12/2021 | Yang et al. | H04W 72/0453 |

FOREIGN PATENT DOCUMENTS

| | | |
|---|---|---|
| GA | 3039008 A1 | 5/2018 |
| WO | 2018201640 A1 | 11/2018 |
| WO | 2019124067 A1 | 6/2019 |

OTHER PUBLICATIONS

International Search Report and Written Opinion—PCT/US2020/052680—ISA/EPO—dated Dec. 23, 2020.

* cited by examiner

*Primary Examiner* — Ronald B Abelson
(74) *Attorney, Agent, or Firm* — Patterson + Sheridan, L.L.P.

(57) ABSTRACT

Certain aspects of the present disclosure provide techniques for floating-band channel state information (CSI) reference signals (RS). A method that may be performed by an apparatus includes determining a floating band for transmitting one or more CSI-RSs to a wireless device based on a previously scheduled data transmission by the apparatus. The apparatus transmits the one or more CSI-RSs to the wireless device on the floating band. In some aspects, a wireless device receives, from an apparatus, one or more floating-band CSI-RSs. The wireless device generates one or more CSI reports based on the one or more CSI-RSs and transmits the one or more CSI reports.

24 Claims, 10 Drawing Sheets

FLOATING-BAND CSI-RS

CROSS-REFERENCE TO RELATED APPLICATION(S)

This application claims benefit of and priority to U.S. Provisional Application No. 62/905,944, filed Sep. 25, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for channel state information (CSI) reference signals, which may be used between user equipments (UEs) via a sidelink channel. Aspects relate to a floating-band CSI-RS.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the long term evolution (LTE) mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved channel state information (CSI) reporting for sidelink communications.

One or more aspects of the subject matter described in this disclosure can be implemented in a method for wireless communication by an apparatus. The method generally includes determining a floating band for transmitting one or more channel state information reference signals (CSI-RSs) to a wireless device based on a previously scheduled data transmission by the apparatus. The method generally includes transmitting the one or more CSI-RSs to the wireless device on the floating band.

One or more aspects of the subject matter described in this disclosure can be implemented in a method for wireless communication by a wireless device. The method generally includes receiving, from an apparatus, one or more floating-band CSI-RSs. The method generally includes generating one or more CSI reports based on the one or more CSI-RSs and transmitting the one or more CSI reports.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
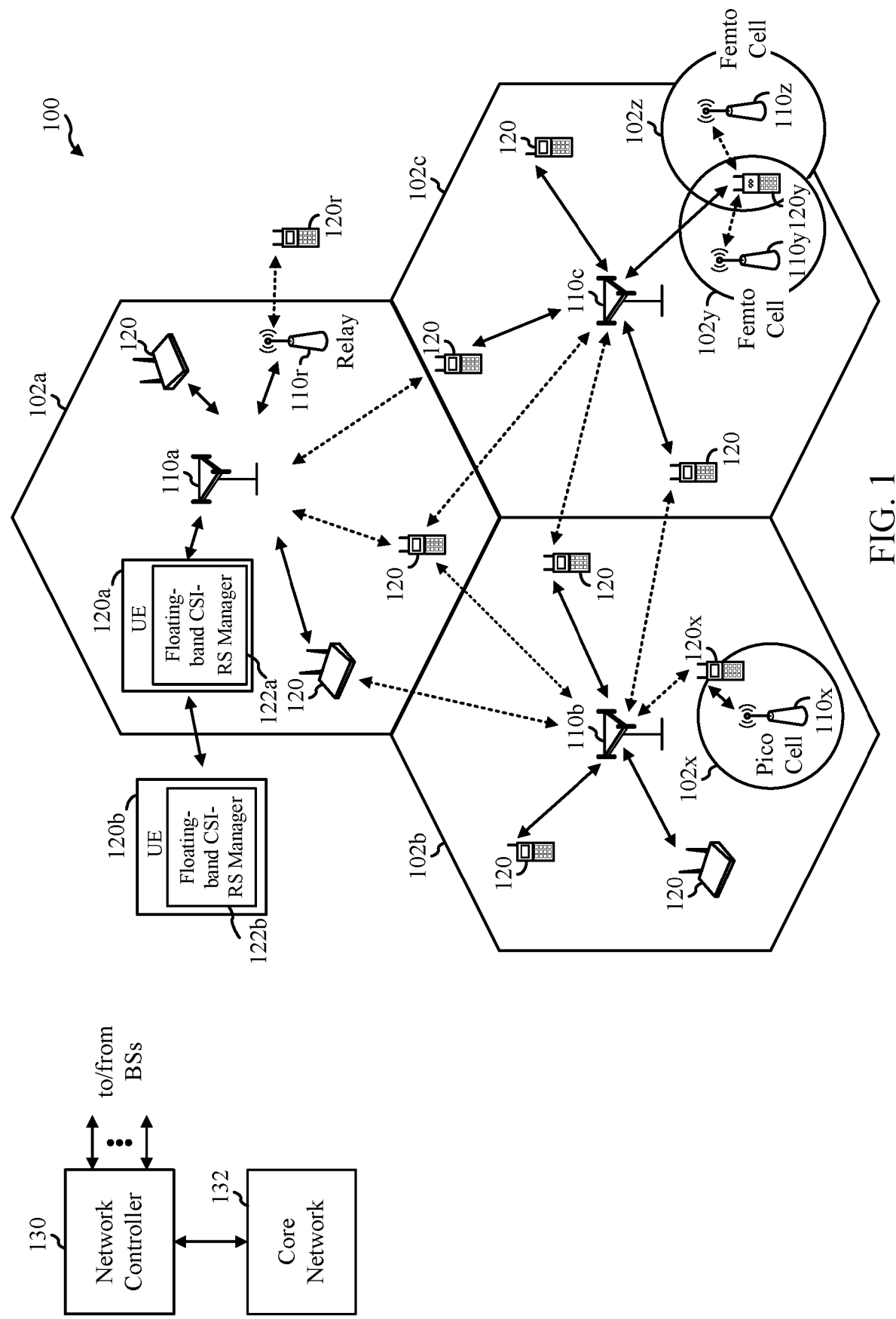
FIG. 1 is a block diagram conceptually illustrating an example telecommunications system, in accordance with certain aspects of the present disclosure.

Aspects of the present disclosure provide apparatus, methods, processing systems, and computer readable mediums for managing channel state information (CSI) reporting via a sidelink channel between user equipment (UEs). As will be described, the techniques presented herein provide for floating-band CSI reference signal (CSI-RS) transmission and CSI reporting based on the floating-band CSI-RS, in sidelink communications. The floating-band CSI-RS may be based on previous data transmission scheduled for the apparatus that transmits the CSI-RS.

The following description provides examples of floating-band CSI-RS that may be used for sidelink in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110*a*-*z* (each also individually referred to herein as BS 110 or collectively as BSs 110) and/or user equipment (UE) 120*a*-*y* (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a*-*y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

According to certain aspects, the UEs 120 may be configured for sidelink communications. As shown in FIG. 1, the UE 110*a* includes a sidelink CSI manager 122*a* and the UE 120*b* includes a floating-band CSI-RS manager 122*b*. The floating-band CSI-RS manager 122*a* and/or the floating-band CSI-RS manager 122*b* may be configured to determining floating-band CSI-RS, send floating-band CSI-RS, receive floating-band CSI-RS, generate a CSI report based on floating-band CSI-RS, send a CSI report, and/or to receive a CSI report, in accordance with aspects of the present disclosure.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
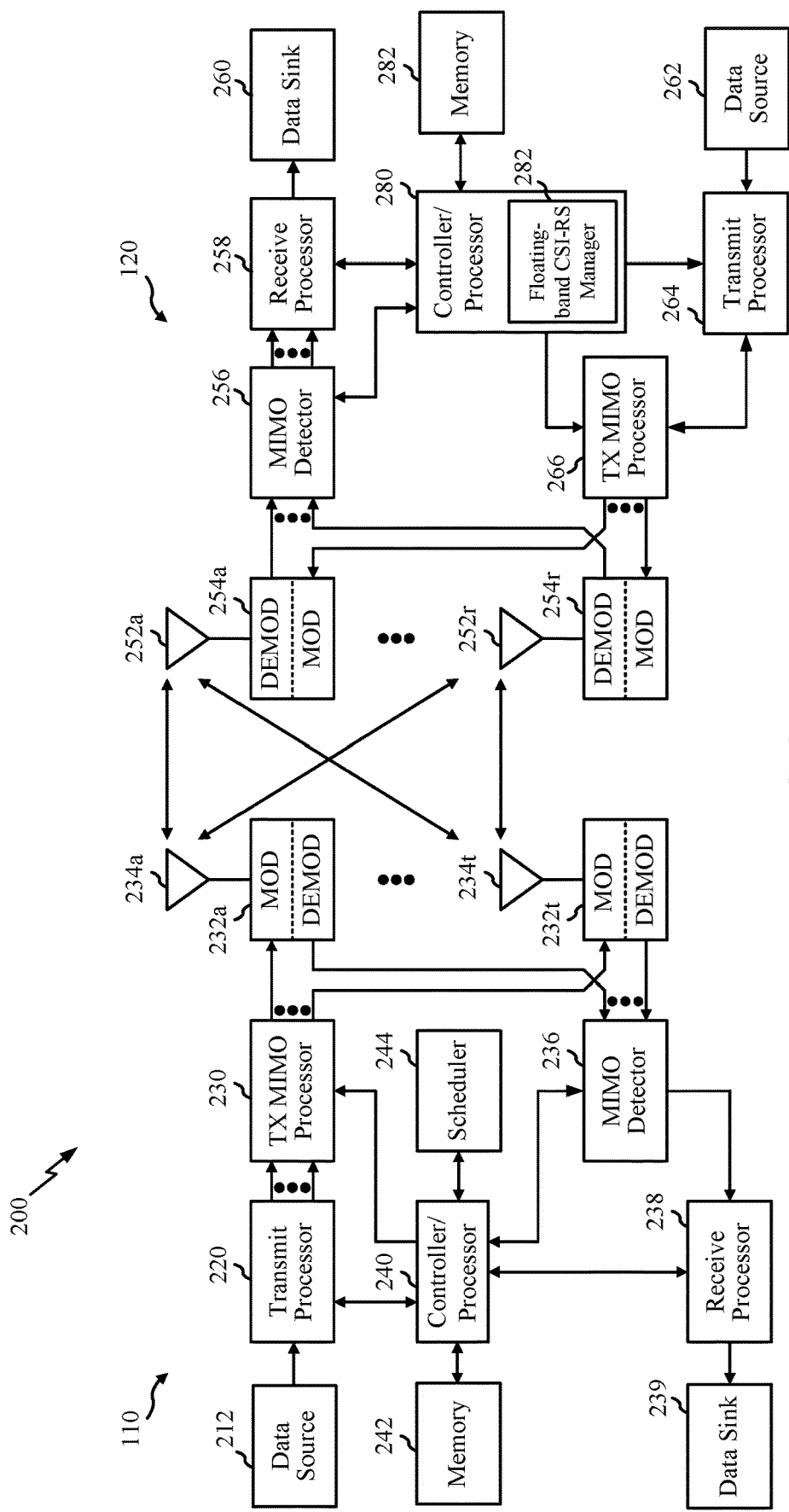
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1, which may be similar components in the UE 120*b*), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a base station may transmit a MAC CE to a UE to put the UE into a discontinuous reception (DRX) mode to reduce the UE's power consumption. The MAC-CE may be carried in a shared channel such as a PDSCH, a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232*a*-232*t* may be transmitted via the antennas 234*a*-234*t*, respectively.

At the UE 120*a*, the antennas 252*a*-252*r* may receive the downlink signals from the BS 110*a* (or sidelink signals from a sidelink device, such as UE 120*b*) and may provide received signals to the demodulators (DEMODs) in transceivers 254*a*-254*r*, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink or sidelink, at UE 120*a*, a transmit processor 264 may receive and process data (e.g., for the PUSCH or the physical sidelink shared channel (PSSCH)) from a data source 262 and control information (e.g., for the physical uplink control channel (PUCCH) or physical sidelink control channel (PSCCH)) from the controller/processor 280. The transmit processor 264 may also generate reference symbols for a reference signal (e.g., for the sounding reference signal (SRS) or CSI-RS). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a* or sidelink UE 120*b*. At the BS 110*a* (or at a receiving sidelink UE), the uplink (or sidelink) signals from the UE 120*a* may be received by the antennas 234, processed by the demodulators, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* may be used to perform the various techniques and methods described herein. For example, as shown in FIG. 2, the controller/processor 280 of the UE 120*a* has a floating-band CSI-RS manager 222 that may be configured to determine floating-band CSI-RS, send floating-band CSI-RS, receive floating-band CSI-RS, generate a CSI report based on floating-band CSI-RS, send a CSI report, and/or to receive a CSI report, in accordance with aspects of the present disclosure.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
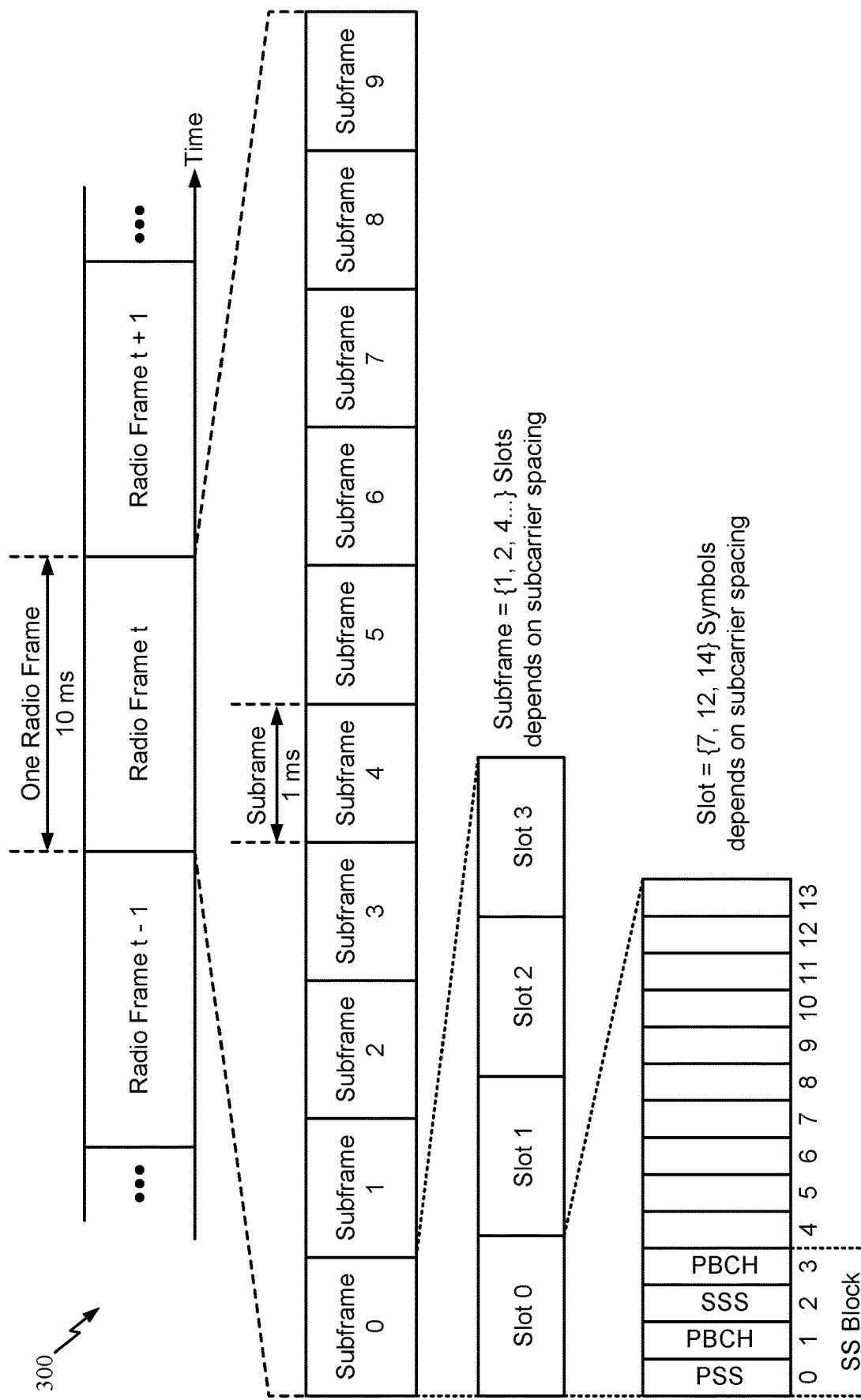
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, V2X, Internet-of-Everything (IoE) communications, Internet-of-Things (IoT) communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figure 4:
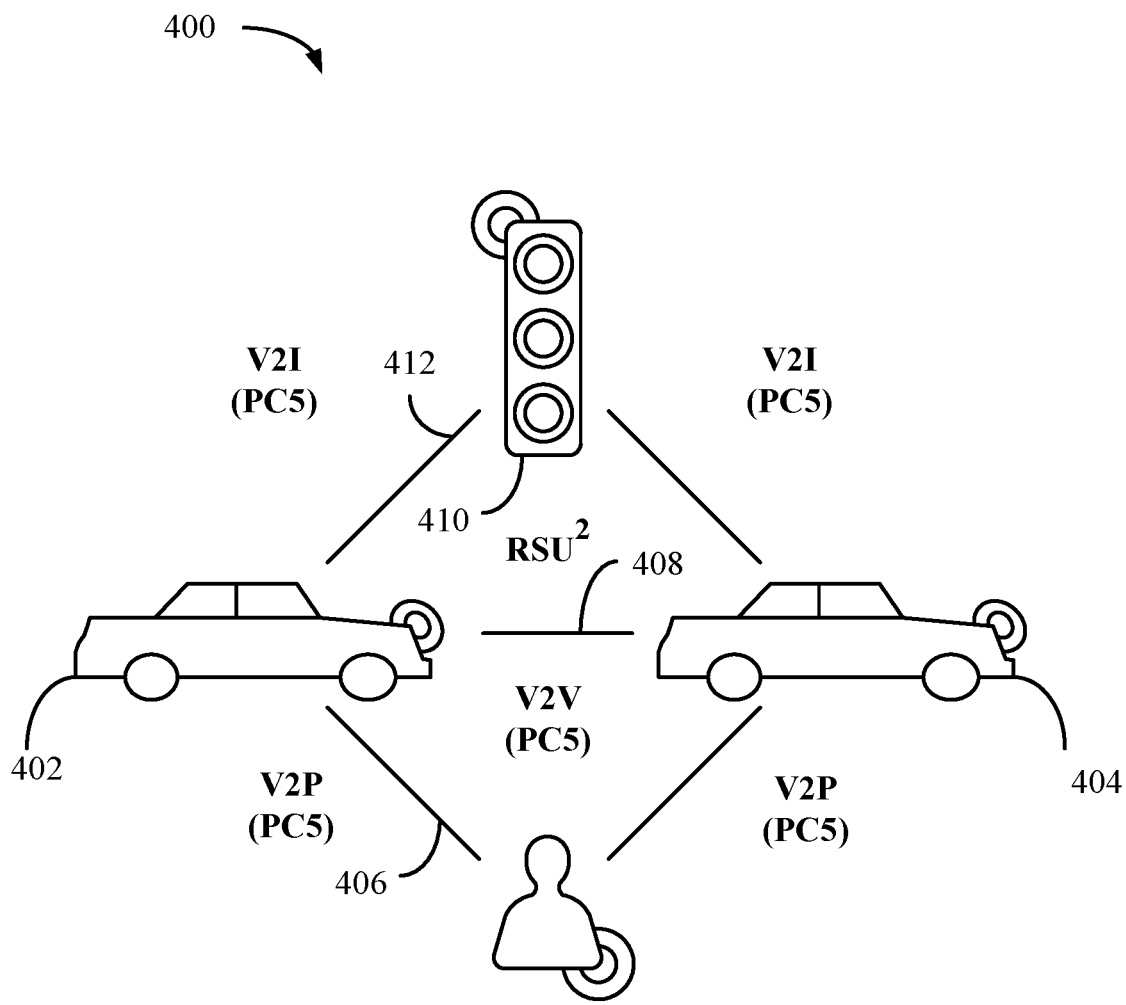
FIG. 4 illustrates an example vehicle-to-everything (V2X) communication system, in accordance with certain aspects of the present disclosure.
Figure 5:
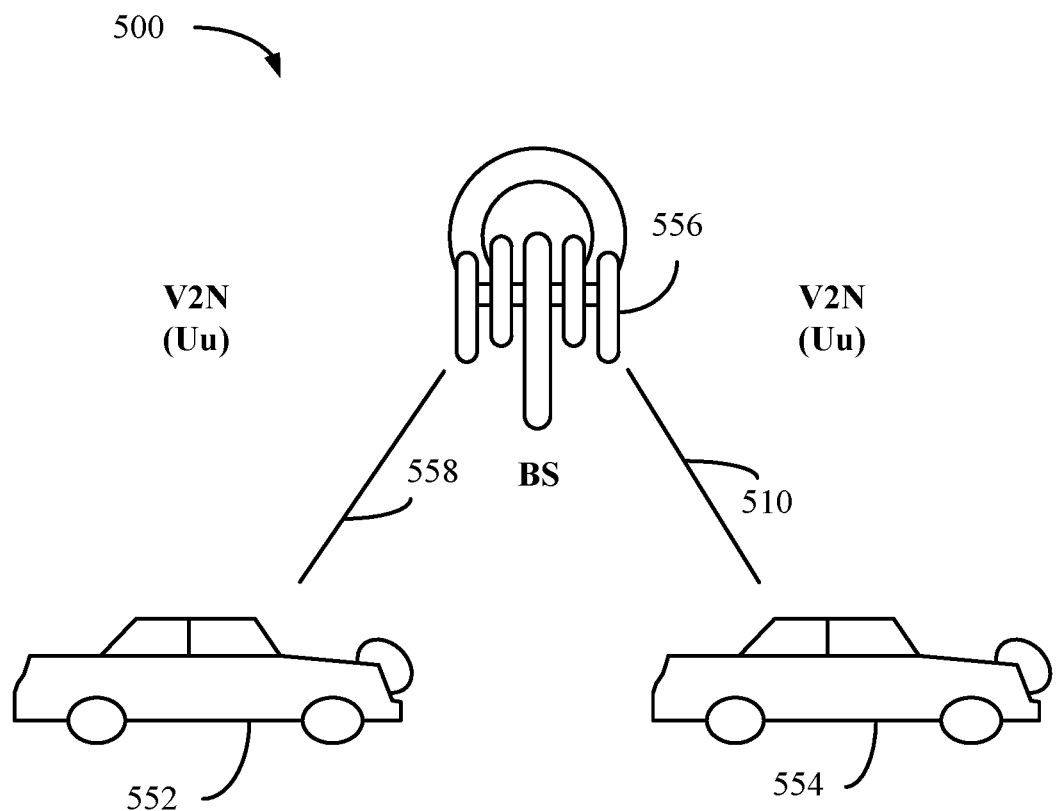
FIG. 5 illustrates another example V2Xcommunication system, in accordance with certain aspects of the present disclosure.

FIG. 4 and FIG. 5 show diagrammatic representations of example vehicle to everything (V2X) systems in accordance with some aspects of the present disclosure. For example, the vehicles shown in FIG. 4 and FIG. 5 may communicate via sidelink channels and may perform sidelink CSI reporting as described herein.

The V2X systems, provided in FIG. 4 and FIG. 5 provide two complementary transmission modes. A first transmission mode, shown by way of example in FIG. 4, involves direct communications (for example, also referred to as side link communications) between participants in proximity to one another in a local area. A second transmission mode, shown by way of example in FIG. 5, involves network communications through a network, which may be implemented over a Uu interface (for example, a wireless communication interface between a radio access network (RAN) and a UE).

Referring to FIG. 4, a V2X system 400 (for example, including V2V communications) is illustrated with two vehicles 402, 404. The first transmission mode allows for direct communication between different participants in a given geographic location. As illustrated, a vehicle can have a wireless communication link 406 with an individual (e.g., in V2P, and may be via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (e.g., in V2I) through a PC5 interface 412. With respect to each communication link illustrated in FIG. 4, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5 shows a V2X system 500 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle-to-network (V2N) links 558 and 510 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

As mentioned above, aspects of the disclosure related to sidelink CSI.

CSI in new radio (NR) includes a variety of channel quality metrics. For example, NR channel quality metrics may include channel quality indicator (CQI), precoding matrix indicator (PMI), CSI-RS resource indicator (CRI), strongest layer indication (SLI), rank indication (RI), and layer 1 reference signal receive power (L1-RSRP). One or more of the NR channel quality metrics may be used for beam management.

For V2X deployments, such as described with reference to FIG. 4 and/or FIG. 5, CSI reporting can be enabled and disabled by configuration. For flexibility, devices may be configured to report a subset of the metrics for CSI reporting.

CSI reporting configuration and scheduling in NR may depend on the type of CSI reporting. The type of channel that carries the CSI report may depend on the type of CSI reporting. For example, periodic CSI reporting may be carried on short PUCCH or a long PUCCH, while semi-persistent (SP) CSI reporting may be carried on long PUCCH or on a PUSCH. Resources and transmission parameters (e.g., modulation and coding scheme (MCS)) for SP-CSI on PUSCH may be allocated semi-persistently using downlink control information (DCI). SP-CSI may support Type II CSI reporting with a minimum periodicity of 5 ms. SP-CSI reporting may not supported for aperiodic CSI-RS (although this lack of support does not preclude one CSI report carried by multiple uplink reporting instances). In NR, A-CSI reporting may be carried on PUSCH multiplexed with or without uplink data. Periodic and semi-persistent CSI reporting in NR may supports the following periodicities: {5, 10, 20, 40, 80, 160, 320} slots.

In some systems, sidelink CSI-RS may support CQI/RI measurement for no more than two ports. Sidelink CSI-RS may be confined within the PSSCH transmission. However, more detailed CSI may be desirable, such as for beam management and MIMO. These various use cases of sidelink may involve different CSI reporting procedures (e.g., depending on the amount of feedback and the available resources).

In conventional systems, on Uu (access link), scheduling for data transmissions for both uplink and downlink is done by the BS (e.g., gNB). In sidelink scenarios, however, the relationship between the two UEs is more symmetric. For example, in LTE sidelink and NR sidelink V2X, the data-transmitting UE typically performs the scheduling. The data-transmitting UE can select the resources for data transmissions from a configured resource pool (e.g., a set of resources configured by the gNB).

The sidelink communication may be constrained in that when a UE transmits data on a frequency allocation (e.g., inside its transmit pool), then the UE transmits on a different frequency allocation (e.g., inside its transmit pool) in the next time. The selection of the next frequency allocation may be unknown at the current transmission time (e.g., it may depend on other intended or measured transmissions/receptions at that time).

Accordingly, techniques and apparatus for CSI-RS transmission and reception, CSI reporting, that may be used even in cases when the frequency allocation may be unknown, are desirable.

Example Floating-Band CSI-RS

Aspects of the present disclosure provide for floating-band channel state information reference signals (CSI-RS). In some examples, the floating-band CSI-RS is used for CSI reporting between user equipments (UEs) via a sidelink channel. The bandwidth and/or frequency range of the floating-band CSI-RS can be based on a previously scheduled data transmission of the apparatus that transmits the floating-band CSI-RS.

Figure 6:
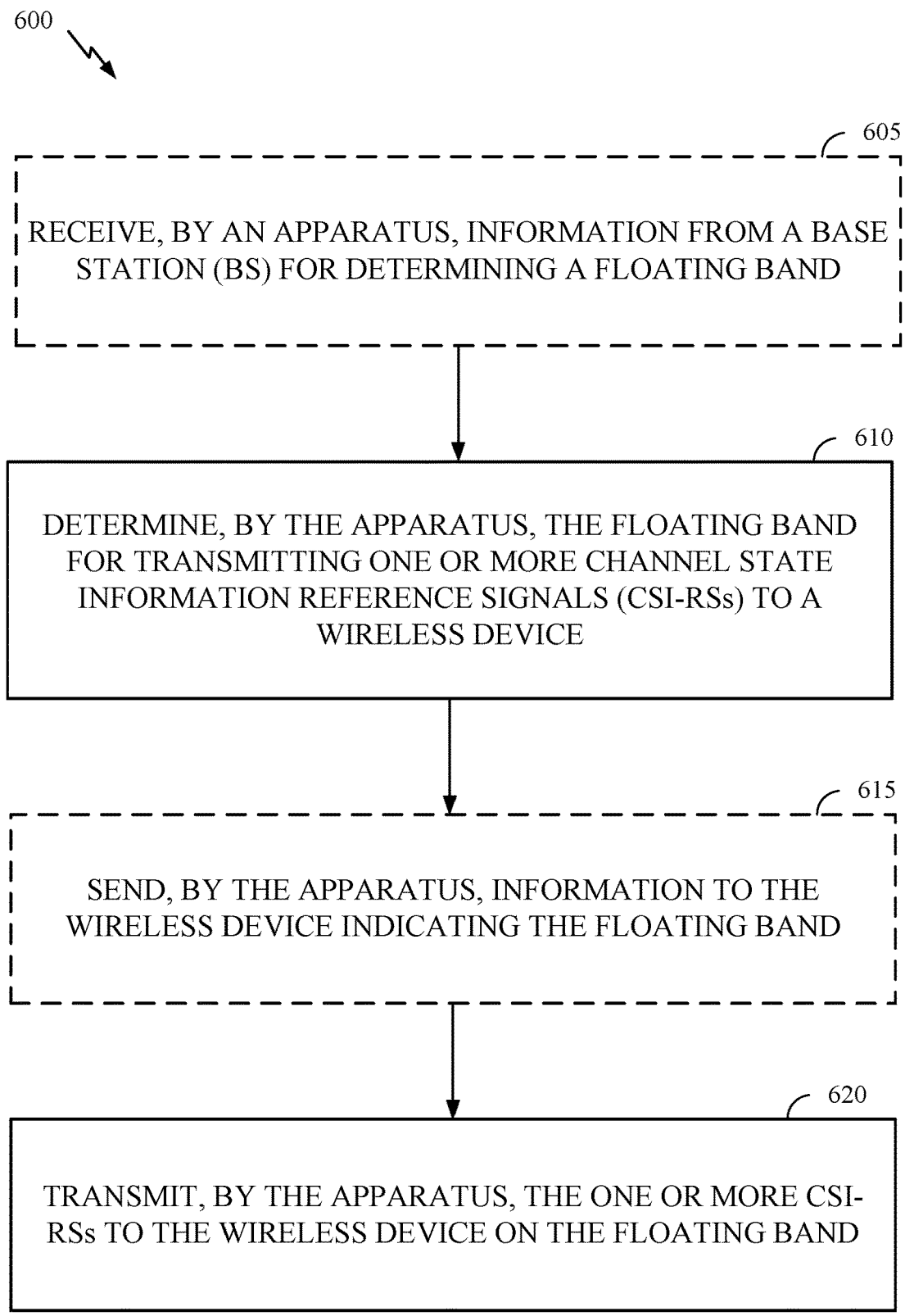
FIG. 6 is a flow diagram illustrating example operations for a channel state information (CSI) process by a CSI reference signal (CSI-RS) transmitting sidelink UE, in accordance with certain aspects of the present disclosure.

FIG. 6 is a flow diagram illustrating example operations 600 for wireless communication, in accordance with certain aspects of the present disclosure. The operations 600 may be performed, for example, for a CSI process by an apparatus that transmits CSI-RS. In some examples, the apparatus may be an access node (e.g., a base station (BS), such as BS 110a in the wireless communication network 100). In some examples, the apparatus may be a wireless sidelink device, such as a sidelink user equipment (UE) (e.g., such as a UE 120a and/or 120b in the wireless communication network 100).

The operations 600 may begin, at 610, by determining a floating-band for transmitting one or more CSI-RSs to a wireless device based on a previously scheduled data transmission by the apparatus. In some examples, the wireless device is a UE, which may be a served UE when the apparatus is an access node or another sidelink UE when the apparatus is a wireless sidelink device. The one or more CSI-RSs may be sidelink RSs when the apparatus is a sidelink UE. In some examples, the previously scheduled data transmission is previous physical sidelink shared channel (PSSCH) transmission by the apparatus. The previously scheduled data transmission may be the immediately preceding transmission or data transmission by the apparatus.

According to certain aspects, the bandwidth and/or frequency range of the floating band for the CSI-RS is different than the bandwidth and/or frequency range of the previously scheduled data transmission. For example, the floating band may be wider, may encompass, may be offset from, and/or may be adjusted with respect to, the bandwidth and/or frequency range of the previously scheduled data transmission. In some examples, the floating band includes the frequency range of the previously scheduled data transmission and additionally includes adjacent frequency resource around the frequency range of the previously scheduled data transmission.

According to certain aspects, the floating-band may be determined based on a configuration. As shown, optionally, at 605, the apparatus may receive information from a BS for determining the floating. In some examples, the apparatus may receive downlink control information (DCI) or radio resource control (RRC) signaling from a BS (e.g., a gNB) configuring the floating band, or indicating the adjacent resources for the floating band. In some examples, the apparatus may receive sidelink RRC signaling or sidelink control information (SCI) from a sidelink wireless device configuring the floating band, or indicating the adjacent resources for the floating band. The frequency resources may be indicated as a number of adjacent resource blocks (RBs) or a number of adjacent frequency subbands.

As shown, optionally, at 615, the apparatus sends information to the wireless device indicating the floating band. According to certain aspects, the apparatus dynamically indicates the determined floating band (e.g., the frequency range) of the CSI-RS to the wireless device. For example, the apparatus may indicate the determined floating band via sidelink control information (SCI). In some examples, the SCI may be carried in a physical sidelink control channel (PSCCH). In some examples, the SCI may be carried in the PSCCH scheduling the previously scheduled data transmission.

According to certain aspects, other parameters (e.g., besides the bandwidth and frequency range) of the CSI-RS can be based (e.g., implicitly depend) on the previously scheduled data transmission. For example, the density of the floating-band CSI-RS in frequency, time, or both, may be based on one or more parameters of the previously scheduled data transmission (e.g., based on the bandwidth and/or rank of the previously scheduled data transmission). The association of the parameters of the previously scheduled data transmission to the parameters of the floating-band CSI-RS may be configured by the BS (e.g., gNB), configured by a sidelink device via sidelink RRC, and/or specified in the IEEE standards.

According to certain aspects, the floating band may include all of a current active bandwidth part (BWP). In some examples, the floating band is a wideband.

Figure 8:
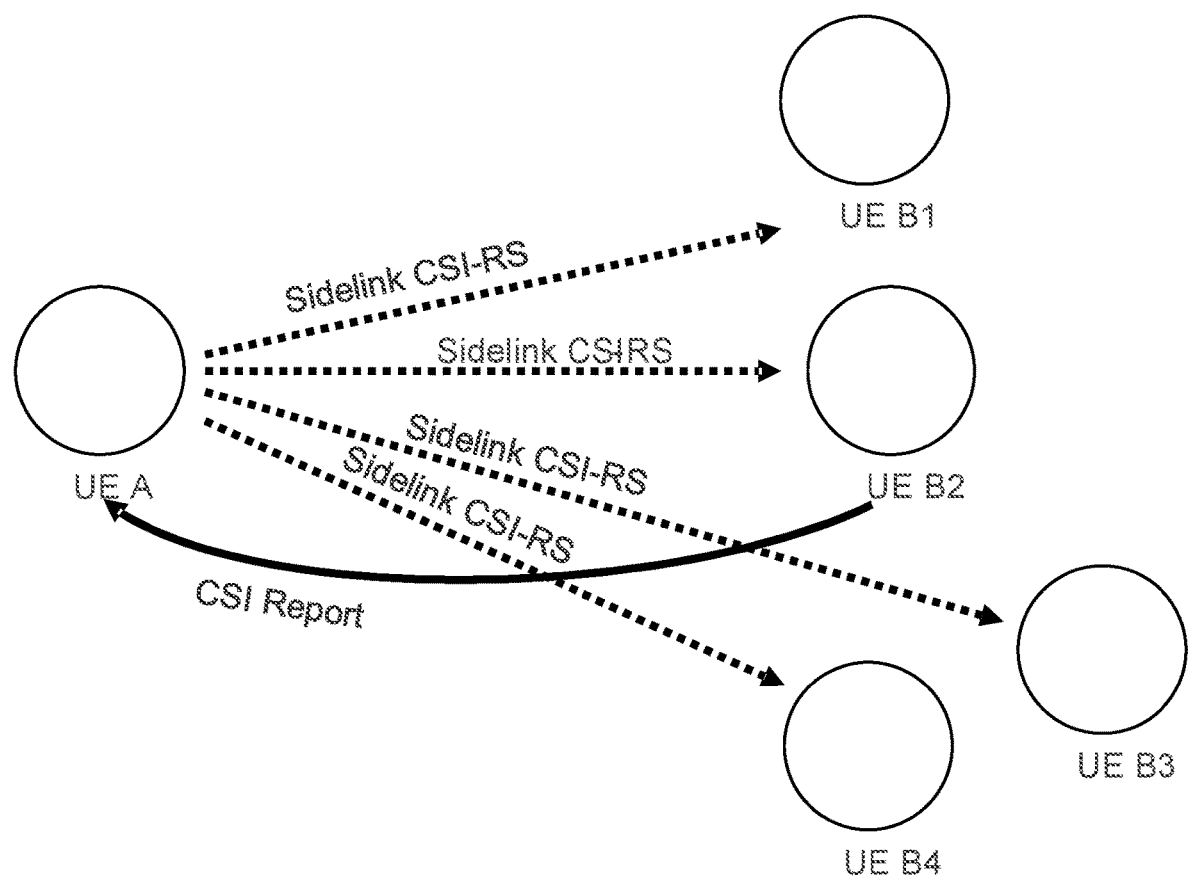
FIG. 8 is a diagram illustrating example groupcast CSI-RS via a sidelink channel, in accordance with certain aspects of the present disclosure.

At 620, the apparatus transmits the one or more CSI-RSs to the wireless device on the floating band. In some examples, the apparatus transmits the one or more CSI-RSs to the wireless device via a sidelink channel. In some examples, the apparatus transmits (e.g., groupcasts) the floating-band CSI-RS targeting a group of wireless devices. FIG. 8 illustrates an example groupcast CSI-RS. As shown in FIG. 8, the UE A sends (e.g., groupcasts) sidelink CSI-RS to the UE B1, UE B2, UE B3, and UE B4. In some examples, the apparatus selects the UEs to report CSI for the groupcast CSI-RS, for example, to make better use of system resources and adapt sidelink CSI reporting to only certain UEs of interest or to stagger CSI reporting from multiple UEs. As shown in FIG. 8, only the UE B2 sends a CSI report to the UE A.

According to certain aspects, the apparatus may configure the wireless device with a CSI report setting. For example, the apparatus may configure the wireless device with the CSI report setting via SCI and/or sidelink RRC. In some examples, the apparatus determines parameters of the CSI report setting based on parameters of the previously scheduled data transmission. The apparatus may receive a CSI report from the wireless device based on (e.g., in accordance with) the CSI report setting. In some examples, the CSI report setting configures different CSI reports for the CSI-RS. For example, the CSI report setting may configure the wireless device to transmit a first CSI report to the apparatus and a second CSI report to a BS (e.g., the gNB). In some examples, the CSI report setting configures different parameters for the different reports. For example, the CSI report setting may configure the wireless device to transmit CSI reports to the apparatus more frequently than CSI reports to the BS. In another example, the CSI report setting may configure the CSI report for estimation of sidelink interference power estimation only.

Figure 7:
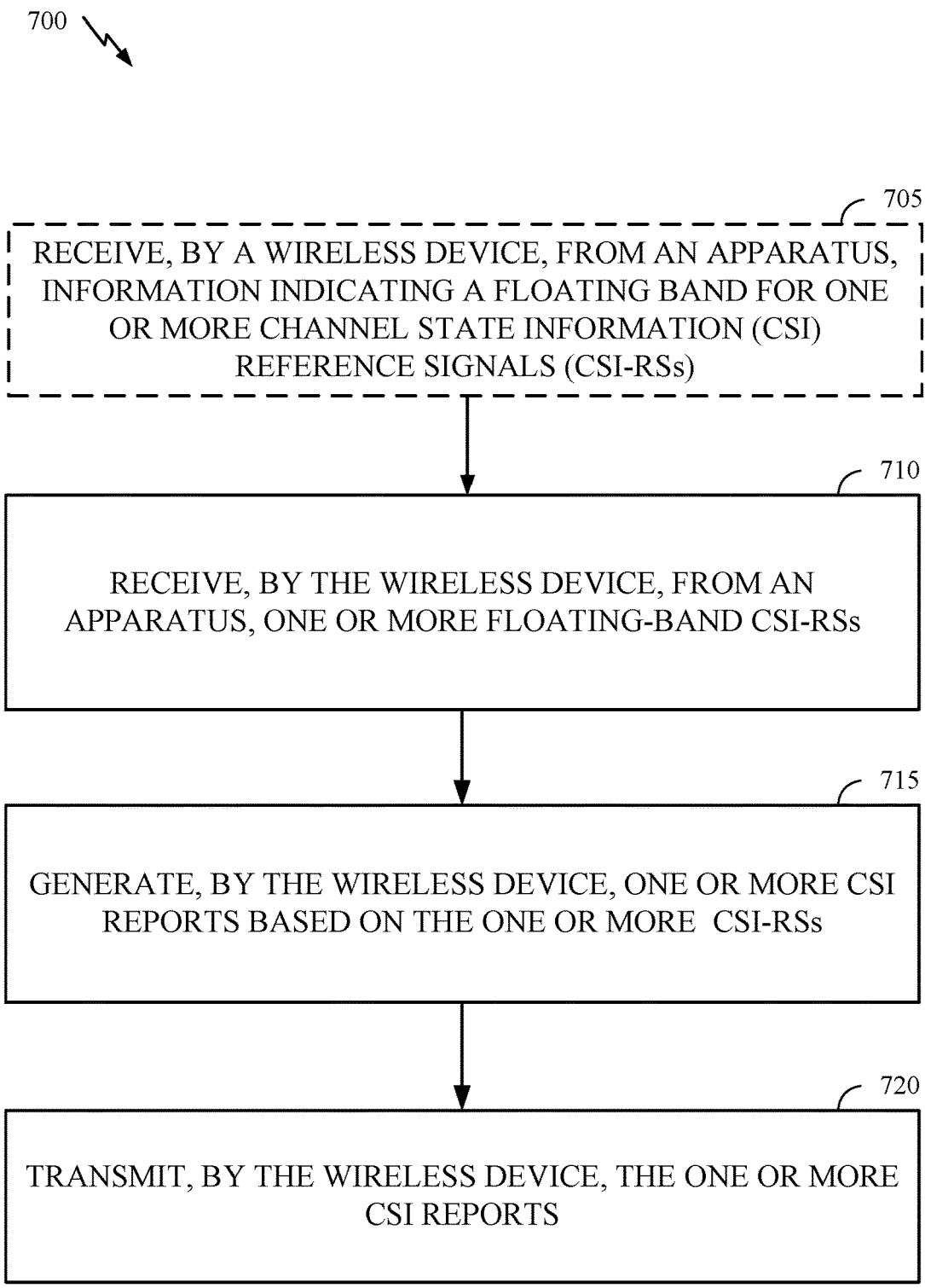
FIG. 7 is a flow diagram illustrating example operations for a CSI process by a CSI reporting sidelink UE, in accordance with certain aspects of the present disclosure.

FIG. 7 is a flow diagram illustrating example operations 700 for wireless communication, in accordance with certain aspects of the present disclosure. The operations 700 may be performed, for example, for a CSI process by a CSI reporting by a wireless device. The wireless device may be sidelink UE (e.g., such as a UE 120*a* or 120*b* in the wireless communication network 100). The operations 700 may be complimentary operations by the UE to the operations 600. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 710, by receiving (e.g., via an access link or sidelink), from an apparatus (e.g., a gNB or a sidelink UE), one or more floating-band CSI-RSs (e.g., access link CSI-RS or sidelink CSI-RS).

According to certain aspects, the floating band is based on a previously scheduled data transmission (e.g., PSSCH) by the apparatus (e.g., the frequency range for the CSI-RS may be different than a frequency range of the previously scheduled data transmission). The frequency range for CSI-RS may include the frequency range of the previously scheduled data transmission and one or more adjacent frequency resources around the frequency range of the previously scheduled data transmission. In some the examples, the floating-band includes all of a current active bandwidth part. In some examples, the floating-band is a wideband.

In some cases, optionally, at 705, the wireless device may receive information from an apparatus (e.g., a BS or another sidelink UE) indicating the floating band for the one or more CSI-RSs. According to certain aspects, other parameters, such as a density of the sidelink CSI-RS in frequency, time, or both, are based on one or more parameters of the previously scheduled data (e.g., the bandwidth and/or rank of the previously scheduled data transmission). The wireless device may receive an indication of the association of the density of the sidelink CSI-RS to the parameters of the previously scheduled data from BS (e.g., via DCI or RCE), from a sidelink wireless device (e.g., via a sidelink RRC signaling), specified in a wireless standard specification, or a combination thereof.

According to certain aspects, the wireless device receives configuring from a BS (e.g., via DCI or RRC) or from the apparatus (e.g., via sidelink RRC or SCI) indicating the floating-band. The wireless device may monitor the floating-band for the one or more CSI-RSs based on the received configuring. The SCI may carried in a PSCCH (e.g., the PSCCH scheduling the previously scheduled data transmission). The received configuring may indicate additional adjacent frequency resources (adjacent to the frequency range of the previously scheduled data transmission by the apparatus), for example, in number of RBs or frequency subbands.

At 715, the wireless device generates one or more CSI reports based on the one or more CSI-RSs. According to certain aspects, the wireless device may be configured with a CSI report setting. For example, the CSI report setting may be configured by a BS (e.g., via DCI or RRC), a sidelink (e.g., via SCI or sidelink RRC). The CSI report setting may configure the wireless device for sending different CSI reports to a BS and to a sidelink UE. In some examples, the CSI report setting configures the wireless device to send the CSI report to the BS less frequently than the CSI report to the sidelink UE. In some examples, the CSI report setting configures the wireless device to send the CSI report for interference estimation only. In some examples, the CSI report setting configures the wireless device to send the CSI report for partial subband reporting.

At 720, the wireless device transmits the one or more CSI reports (e.g., to a sidelink UE and/or to a BS).

Figure 9:
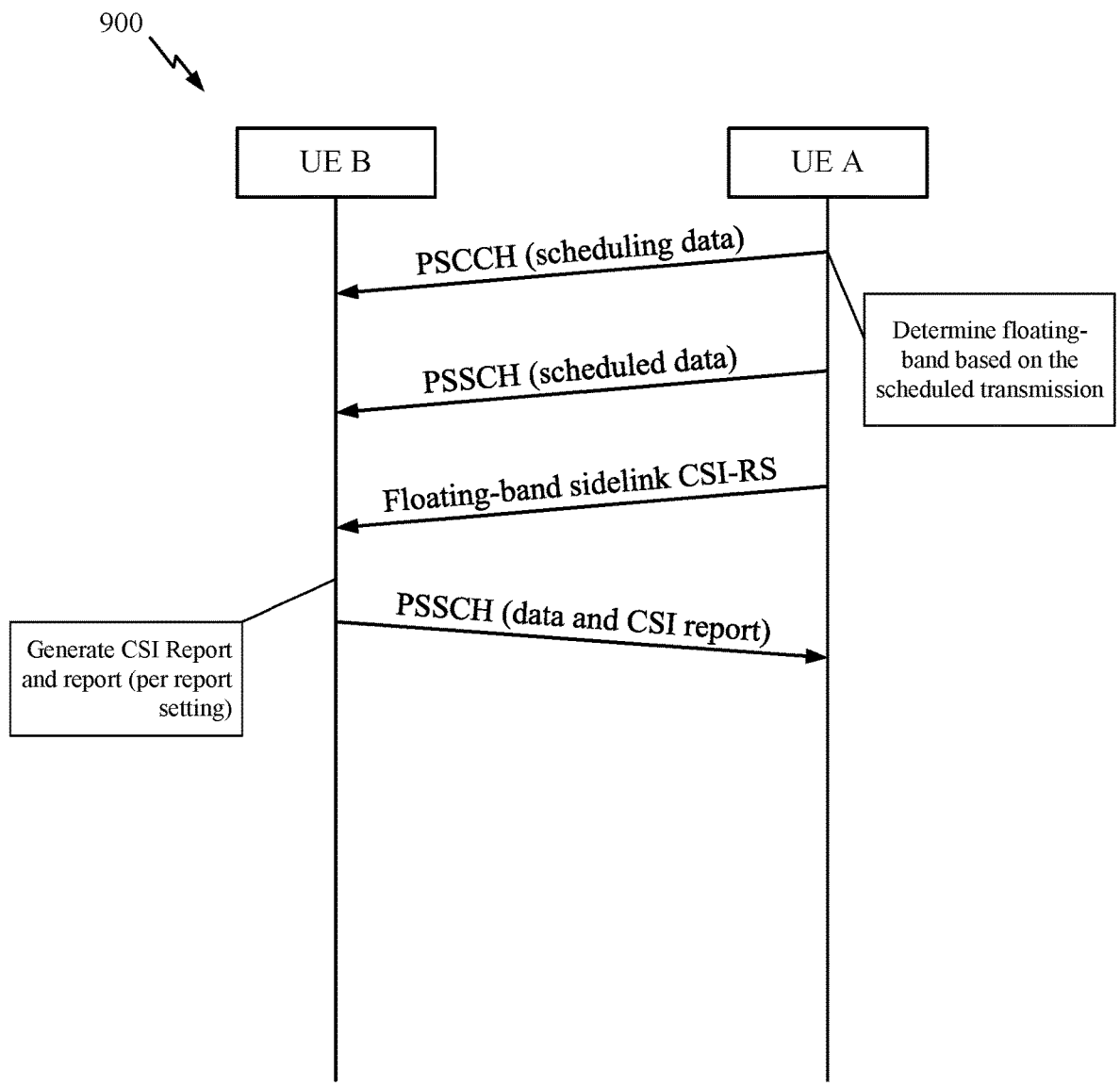
FIG. 9 is a call flow showing example floating-band CSI-RS transmission and CSI reporting between UEs via a sidelink channel, in accordance with certain aspects of the present disclosure.

FIG. 9 is an example call flow 900 showing example floating-band sidelink CSI-RS and CSI reporting between UEs via a sidelink channel, in accordance with certain aspects of the present disclosure. As shown in FIG. 7, a UE A transmits a PSCCH to the UE B scheduling a data transmission to the UE B by the UE A. The UE A then transmits the PSSCH with the scheduled data to the UE B. As shown in FIG. 9, the UE A determines the floating-band for CSI-RS based on the data transmission scheduled by the PSCCH. Although not shown in FIG. 9, as discussed above, the UE A may receive information from a BS (not shown) or from the UE B indicating information for determining the floating band. Further, although not shown in FIG. 9, as discussed above, the UE A or a BS (not shown) may provide an indication to the UE B of the floating band, so the UE B can monitor the floating band for the CSI-RS.

As shown, the UE A transmits the floating-band sidelink CSI-RS to the UE B. The UE B measures the CSI-RS and generates a CSI report. The UE B sends the CSI report (and possibly data) in a PSSCH transmission to UE A. Although not shown in FIG. 9, as discussed above, the UE A or a BS (not shown) may configure the UE B with a CSI report setting that the UE B uses for generating and/or sending the CSI report.

Figure 10:
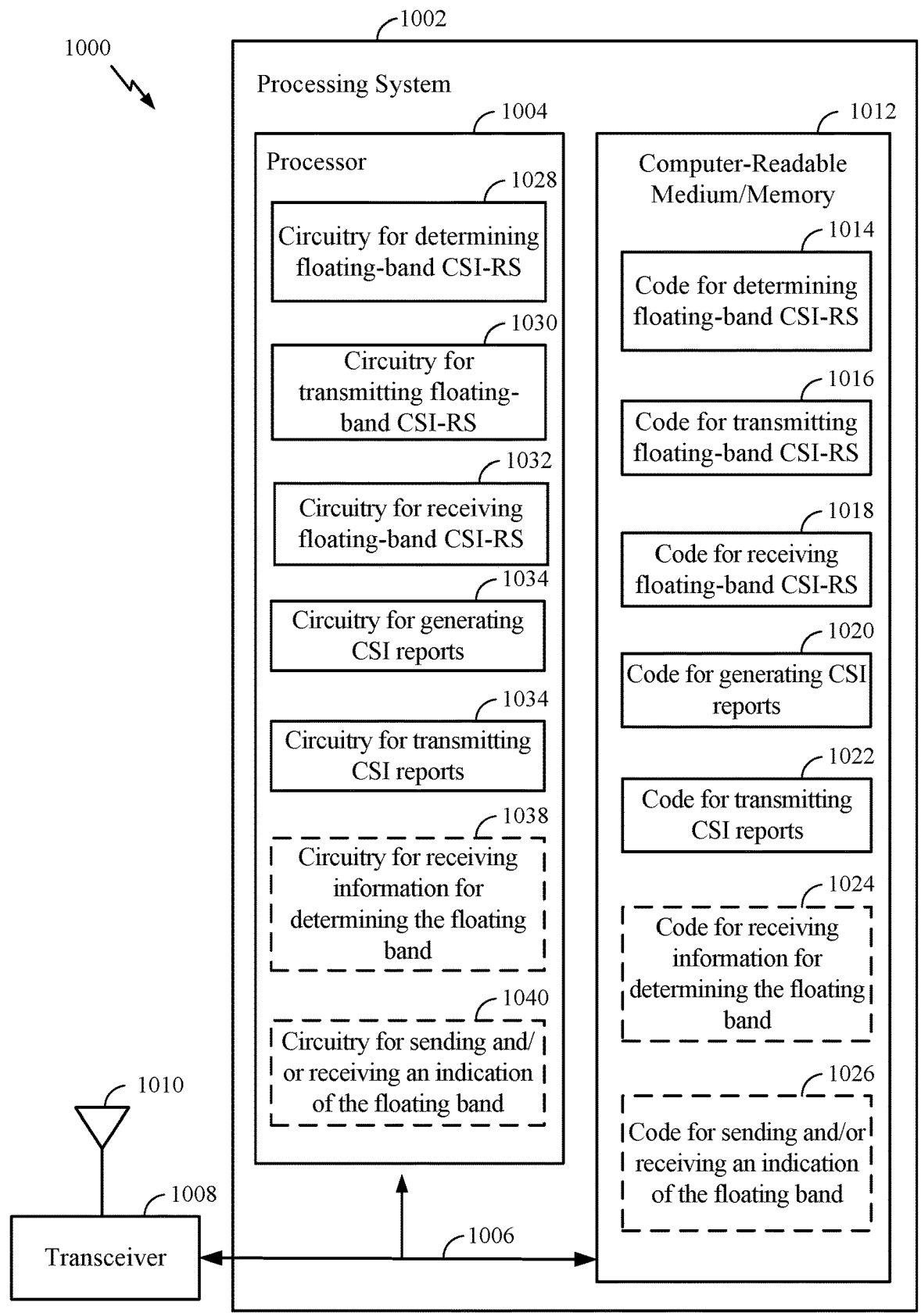
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 6 and/or FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 6 and/or FIG. 7, or other operations for performing the various techniques discussed herein for a floating-band CSI-RS for sidelink. In certain aspects, computer-readable medium/memory 1012 stores code 1014 for determining a floating band for CSI-RS; code 1016 for transmitting floating-band CSI-RS; code 1018 for receiving floating-band CSI-RS; code 1020 for generating CSI reports; code 1022 for transmitting CSI reports; code 1024 for receiving information for determining the floating band; and/or code 1026 for sending and/or receiving an indication of the floating band, in accordance with aspects of the present disclosure. In certain aspects, the processor 1004 has circuitry configured to implement the code stored in the computer-readable medium/memory 1012. The processor 1004 includes circuitry 1028 for determining a floating band for CSI-RS; circuitry 1030 for transmitting floating-band CSI-RS, circuitry 1032 for receiving floating-band CSI-RS; circuitry 1034 for generating CSI reports; circuitry 1036 for transmitting CSI reports; circuitry 1038 for receiving information for determining the floating band; and/or circuitry 1040 for sending and/or receiving an indication of the floating band, in accordance with aspects of the present disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by an apparatus, the method comprising:
   determining a floating band for transmitting one or more channel state information reference signals (CSI-RSs) to a wireless device based on a previously scheduled sidelink data transmission by the apparatus, wherein the floating band comprises a frequency range of the previously scheduled sidelink data transmission and one or more additional adjacent frequency resources around the frequency range of the previously scheduled sidelink data transmission; and
   transmitting the one or more CSI-RSs to the wireless device on the floating band.

2. The method of claim 1, wherein:
   the one or more CSI-RSs comprise one or more sidelink CSI-RSs; and
   transmitting the one or more CSI-RSs to the wireless device comprises transmitting the one or more sidelink CSI-RSs to one or more other wireless devices via a sidelink channel.

3. The method of claim 1, wherein the previously scheduled sidelink data transmission comprises a physical sidelink shared channel (PSSCH) transmission by the apparatus.

4. The method of claim 1, further comprising receiving, from a base station (BS) or another wireless device, downlink control information (DCI) or sidelink radio resource control (RRC) signaling that indicates the one or more additional adjacent frequency resources.

5. The method of claim 4, wherein the one or more additional adjacent frequency resources are indicated as a number of adjacent resource blocks (RBs) or a number of adjacent frequency subbands.

6. The method of claim 1, further comprising indicating, via sidelink control information (SCI) to the wireless device, the floating band for transmitting the one or more CSI-RSs.

7. The method of claim 6, wherein the SCI is carried in a physical sidelink control channel (PSCCH) scheduling the previously scheduled sidelink data transmission.

8. The method of claim 1, further comprising determining a density for transmitting the one or more CSI-RSs in frequency, time, or both, wherein the density is based on one or more parameters of the previously scheduled sidelink data transmission.

9. The method of claim 8, wherein the one or more parameters comprise at least one of: a bandwidth of the previously scheduled sidelink data transmission, a rank of the previously scheduled sidelink data transmission, or a combination thereof.

10. The method of claim 8, wherein an association of the density of the one or more CSI-RSs to the one or more parameters of the previously scheduled sidelink data transmission is configured by a base station (BS), configured by sidelink radio resource control (RRC) signaling from another wireless device, specified in a wireless standard specification, or a combination thereof.

11. The method of claim 1, wherein the floating band comprises all of a current active bandwidth part.

12. The method of claim 1, wherein the floating band comprises a wideband.

13. The method of claim 1, further comprising:
configuring, via sidelink control information (SCI), the wireless device with a CSI report setting including one or more CSI report parameters, wherein the one or more CSI report parameters are based on the previously scheduled sidelink data transmission.

14. The method of claim 13, wherein the CSI report setting configures the wireless device to transmit a first CSI report to the apparatus and a second CSI report to a base station (BS).

15. The method of claim 14, wherein the CSI report setting configures the wireless device to transmit the first CSI report more frequently than the second CSI report.

16. A method of wireless communication by a wireless device, the method comprising:
determining a floating band to monitor one or more channel state information reference signals (CSI-RSs) from a user equipment (UE), wherein the floating band comprises a frequency range of a previous sidelink data transmission by the UE and one or more additional adjacent frequency resources around the frequency range of the previous sidelink data transmission;
receiving, from the UE, the one or more CSI-RSs via a sidelink channel on the floating band;
generating one or more CSI reports based on the one or more CSI-RSs; and
transmitting the one or more CSI reports.

17. The method of claim 16, further comprising:
receiving signaling indicating the floating band from a base station (BS) via at least one of: downlink control information (DCI), sidelink radio resource control (RRC) signaling, or from the UE via sidelink control information (SCI); and
determining the floating band based on the signaling.

18. The method of claim 17, wherein the SCI is carried in a physical sidelink control channel (PSCCH) scheduling the previous sidelink data transmission.

19. The method of claim 17, wherein the signaling indicates the one or more additional adjacent frequency resources.

20. The method of claim 16, wherein the floating band comprises all of a current active bandwidth part or a wideband.

21. The method of claim 16, further comprising:
receiving signaling from the UE or a base station (BS) configuring the wireless device with a CSI report setting via sidelink radio resource control (RRC) signaling, sidelink control information (SCI), downlink control information (DCI), or a combination thereof, wherein
transmitting the one or more CSI reports comprises transmitting the one or more CSI reports in accordance with the CSI report setting.

22. The method of claim 21, wherein the CSI report setting configures the wireless device to transmit a first CSI report to the UE and a second CSI report to the BS.

23. An apparatus, comprising:
at least one processor; and
a memory coupled to the at least one processor, the memory comprising code executable by the at least one processor to cause the apparatus to:
determine a floating band for transmitting one or more channel state information reference signals (CSI-RSs) to a wireless device based on a previously scheduled sidelink data transmission by the apparatus, wherein the floating band comprises a frequency range of the previously scheduled sidelink data transmission and one or more additional adjacent frequency resources around the frequency range of the previously scheduled sidelink data transmission; and
transmit the one or more CSI-RSs to the wireless device on the floating band.

24. An apparatus, comprising:
at least one processor; and
a memory coupled to the at least one processor, the memory comprising code executable by the at least one processor to cause the apparatus to:
determine a floating band to monitor one or more channel state information reference signals (CSI-RSs) from a user equipment (UE), wherein the floating band comprises a frequency range of a previous sidelink data transmission by the UE and one or more additional adjacent frequency resources around the frequency range of the previous sidelink data transmission;
receive the one or more CSI-RSs from the UE via a sidelink channel on the floating band;
generate one or more CSI reports based on the one or more CSI-RSs; and
transmit the one or more CSI reports.

* * * * *